(12) United States Patent
Karniol

(10) Patent No.: US 10,443,865 B1
(45) Date of Patent: Oct. 15, 2019

(54) PORTABLE AIR-CONDITIONING SYSTEM

(71) Applicant: Sandro Karniol, Brooklyn, NY (US)

(72) Inventor: Sandro Karniol, Brooklyn, NY (US)

( * ) Notice: Subject to any disclaimer, the term of this patent is extended or adjusted under 35 U.S.C. 154(b) by 0 days.

(21) Appl. No.: 15/244,047

(22) Filed: Aug. 23, 2016

(51) Int. Cl.
*F24F 1/04* (2011.01)
*H02S 40/38* (2014.01)
*F24F 1/02* (2019.01)
*F24F 5/00* (2006.01)

(52) U.S. Cl.
CPC ............... *F24F 1/04* (2013.01); *F24F 1/025* (2013.01); *H02S 40/38* (2014.12); *F24F 2005/0064* (2013.01)

(58) Field of Classification Search
CPC ...... F24F 1/04; F24F 1/025; F24F 2005/0064; H02S 40/38
See application file for complete search history.

(56) References Cited

U.S. PATENT DOCUMENTS

| | | | |
|---|---|---|---|
| 5,217,408 A | 6/1993 | Kaine | |
| 5,354,117 A * | 10/1994 | Danielson | A47C 3/02 297/180.15 |
| 5,715,695 A | 2/1998 | Lord | |
| 5,921,858 A | 7/1999 | Kawai | |
| 5,924,767 A | 7/1999 | Pietryga | |
| 6,427,476 B1 | 8/2002 | Eddins | |
| 6,786,541 B2 | 9/2004 | Haupt | |
| 7,231,777 B1 * | 6/2007 | Arnold | F24F 1/025 62/259.3 |
| 7,886,548 B1 | 2/2011 | Graves | |
| 8,136,874 B2 * | 3/2012 | Negrini | B60N 2/5692 297/180.11 |
| 2010/0066133 A1 * | 3/2010 | Benton | B60H 1/00264 297/180.14 |

FOREIGN PATENT DOCUMENTS

| | | | | |
|---|---|---|---|---|
| GB | 2440312 A | * | 1/2008 | ............ A47C 7/744 |
| JP | 2003116665 A | * | 4/2003 | |
| JP | 2006329522 A | * | 12/2006 | |
| WO | 2014015457 A1 | | 1/2014 | |

* cited by examiner

*Primary Examiner* — Emmanuel Duke

(57) ABSTRACT

The portable air conditioner system is an electrically operated and portable device that is used for cooling a small, but not necessarily enclosed, space. The portable air conditioner system is adapted to cool one or more objects. The portable air conditioner system is further adapted to be attached to an object selected from the one or more objects. In multiple potential embodiments the portable air conditioner system connects to a circulatory network that provides for more efficiently targeted cooling. The portable air conditioner system comprises a cooling unit, a housing, a control system, and an optional circulatory network. The cooling unit and the control are contained within the housing.

2 Claims, 5 Drawing Sheets

PORTABLE AIR-CONDITIONING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of refrigeration and heating devices, more specifically, a portable refrigeration unit.

SUMMARY OF INVENTION

The portable air conditioner system is an electrically operated and portable device that is used for cooling a small, but not necessarily enclosed, space. The portable air conditioner system is adapted to cool one or more objects. The portable air conditioner system is further adapted to be attached to an object selected from the one or more objects. In multiple potential embodiments the portable air conditioner system connects to a circulatory network that provides for more efficiently targeted cooling.

These together with additional objects, features and advantages of the portable air conditioner system will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable air conditioner system in detail, it is to be understood that the portable air conditioner system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable air conditioner system.

It is therefore important that the claims be regarded as including such equivalent construction insofar as they do not depart from the spirit and scope of the portable air conditioner system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
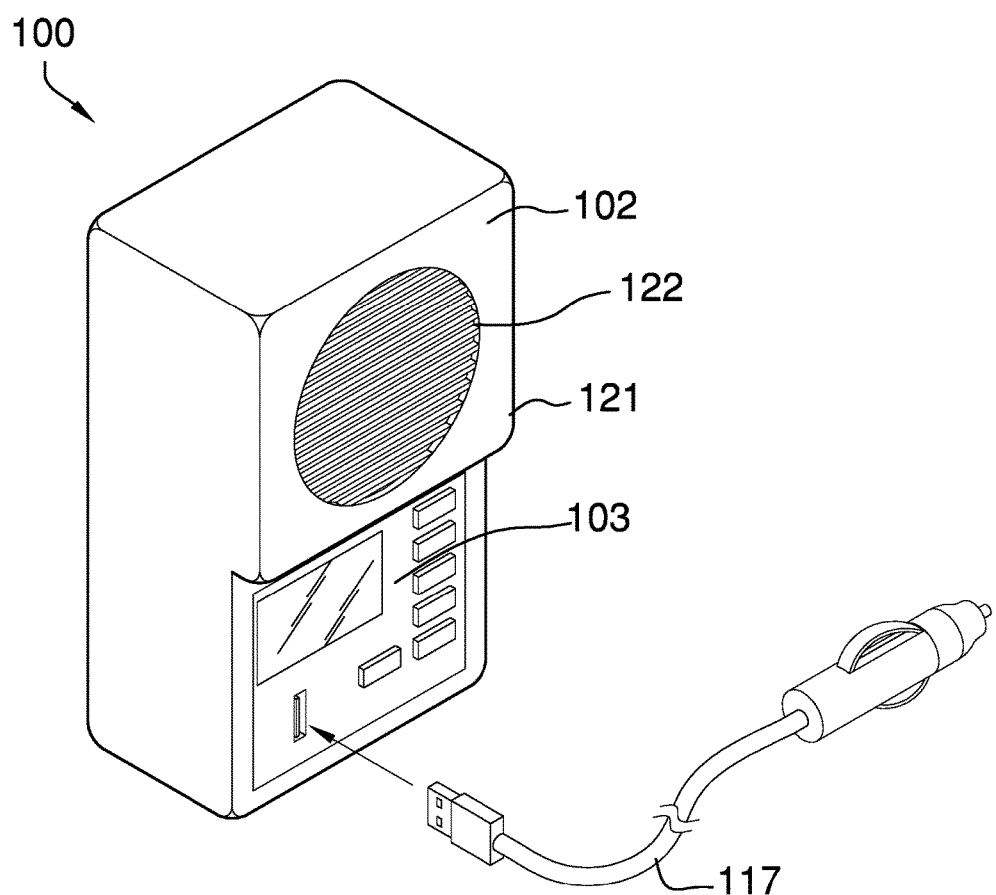
FIG. 1 is a perspective view of an embodiment of the disclosure.
Figure 2:
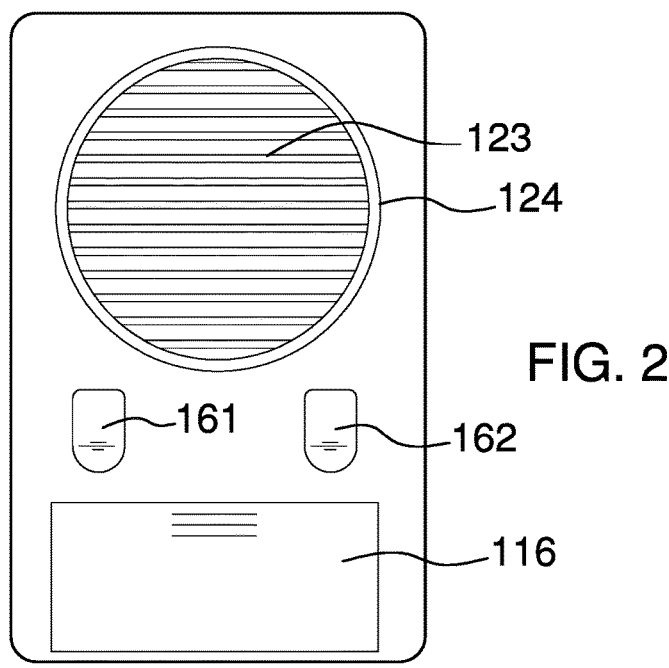
FIG. 2 is a front view of an embodiment of the disclosure.
Figure 3:
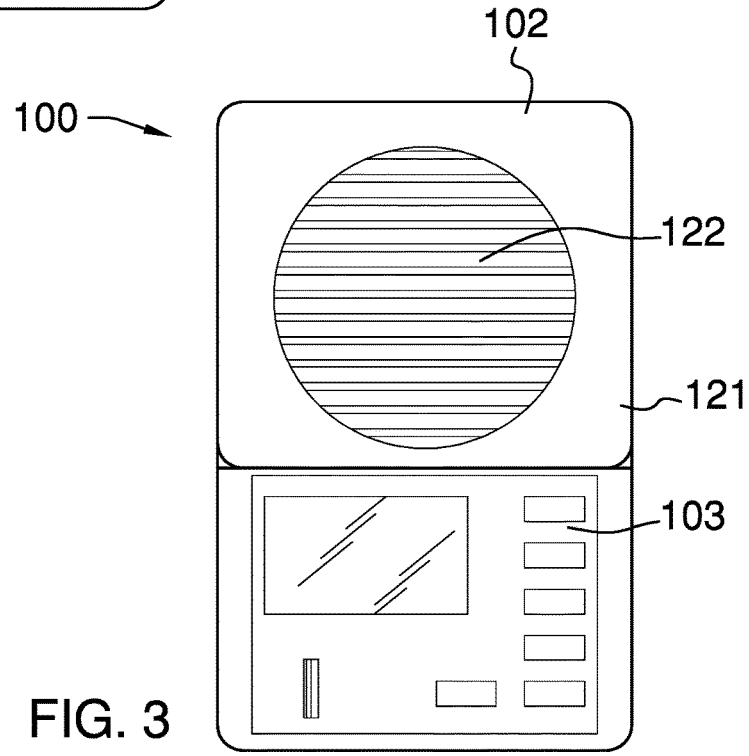
FIG. 3 is a back view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The portable air conditioner system 100 (hereinafter invention) comprises a cooling unit 101, a housing 102, a control system 103, and a circulatory network 141. The cooling unit 101 and the control system 103 are contained within the housing 102. The invention 100 is an electrically operated and portable device that is used for cooling an object 151. The circulatory network 141 is installed within the object 151. The invention 100 attaches to the object 151.

The cooling unit 101 further comprises a compressor 111, a reservoir 114, a battery 116, a charging device 117, and a working fluid 118. The compressor 111, reservoir 114, and working fluid 118 form the basis of the cooling unit 101. In order to operate, the working fluid 118 is pumped through loop comprising the circulatory network 141, the compressor 111, and the reservoir 114. The working fluid 118 is a compressible fluid, which can be either liquid or gas, which is used as a refrigerant. In the cooling unit 101, the compressor 111 is a mechanical device that is used to increase the pressure of the working fluid 118. The compressor 111 is commercially available and, for the purposes of this disclosure, is assumed to incorporate an electric motor and any mechanical regulation necessary for operation. The reservoir 114 is a collection tank that is used to store the natural variations of the flow of the working fluid 118 through the circulatory network 141. The chemical energy stored within the battery 116 is renewed and restored through use of the charging device 117. The charging device 117 is an electrical circuit that reverses the polarity of the battery 116 and provides the energy necessary to reverse the chemical processes that the battery 116 initially used to generate electrical energy. This reversal of the chemical process creates a chemical potential energy that can later be used to generate electricity. The battery 116 provides electrical energy for the operation of the compressor 111 and the control system.

Figure 4:
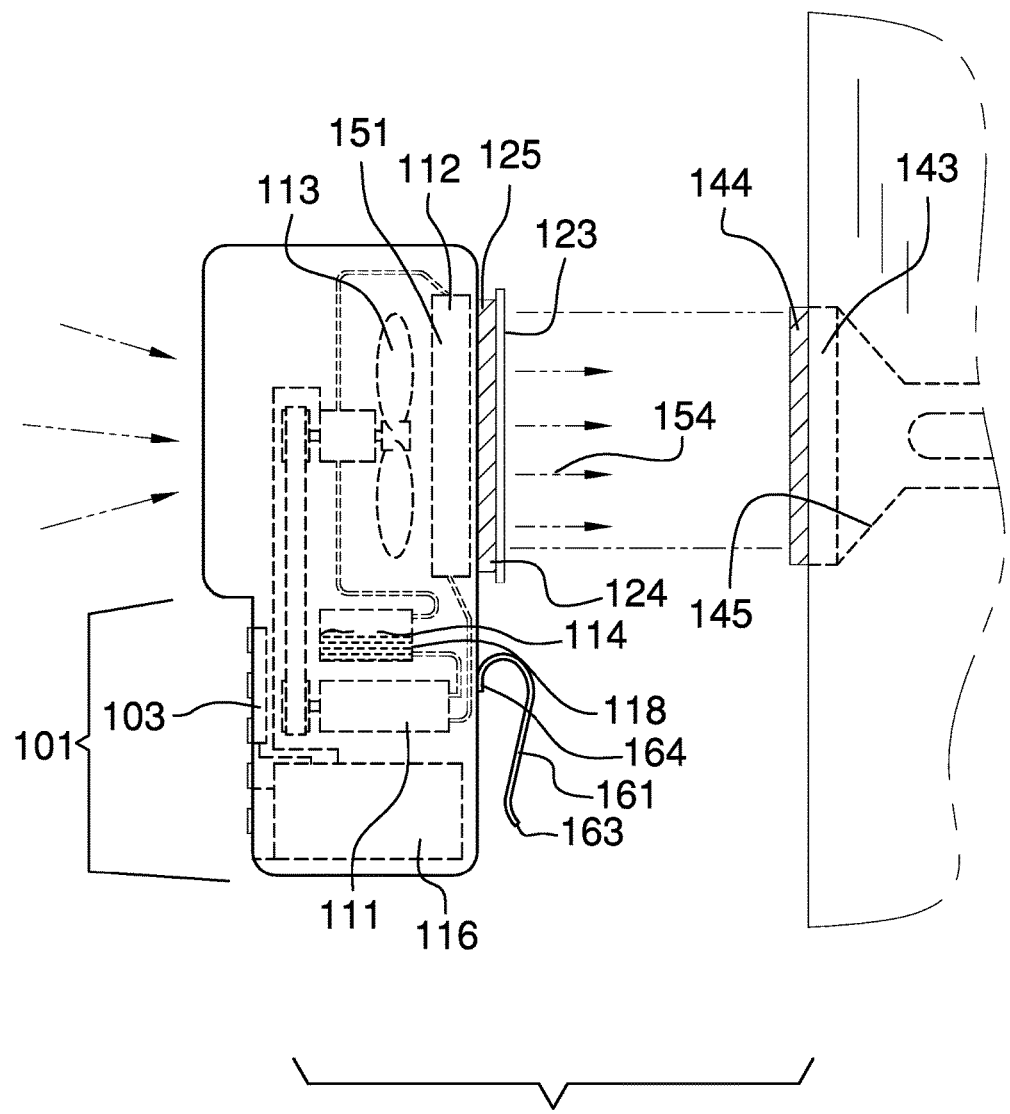
FIG. 4 is a block diagram of an embodiment of the disclosure.

As shown in FIG. 4, the circulatory network 141 operates as described in this paragraph. The circulatory network 141 is a plumbing loop that is installed in an object 151. The purpose of the circulatory network 141 is to cool the object 151. The circulatory network 141 cools the object 151 through the reduction of pressure of the working fluid 118 as it passes through the object 151. The object 151 may also be referred to as an evaporator 112, which is the component of the circulatory network 141 that is commonly used in a refrigeration cycle or other water-based cooling system. Specifically, this reduction of pressure of the working fluid 118 causes a decrease of temperature across the object 151. The compressor 111 increases the pressure of the working fluid 118 and pumps the working fluid 118 into the circulatory network 141. The circulatory network 141 is piped to discharge the working fluid 118, at the reduced pressure, to the reservoir 114, which provides the stock of working fluid 118 form which the compressor 111 draws.

The cooling unit 101 is stored in the housing 102. The housing 102 is a rigid structure that further comprises a container 121, an air intake vent 122, and an exit vent 123. The cooling unit 101 is stored within the container 121. The air intake vent 122 is a first port that is formed in the side of the container 121. The exhaust vent 123 is a second port that is formed in the side of the container 121. The air exhaust vent 122 and the intake vent 123 allow for air flow in order to cool the evaporator 112. The housing 102 has further associated with it a ring 124. The ring 124 is a structural ring that is attached to the housing and a vehicle seat 171. The ring 124 is further formed with an interior screw thread 125. The ring 124 is attached to a first exterior screw thread 144 that is formed on the vehicle seat 171 in order to attach the housing 102 to the vehicle seat 171.

The control system 103 is a commercially available system that is used to turn the invention 100 on and off.

In the first potential embodiment of the disclosure, the invention 100 is intended as a cooling device for an object 151 that has had a circulatory network 141 installed within the object 151. In this scenario, the object 151 further comprises a collar 145 and a first exterior screw thread 144. The first exterior screw thread 144 is formed on the collar 145. The collar 145 is a ridge that forms a rim that is formed in the object 151. The rim defines the perimeter within which the circulatory network 141 is accessed. The housing 102 is then attached to the object 151 by attaching the first exterior screw thread 144 of the collar 145 to the interior screw thread 125 of the container 121. The purpose of attaching the housing 102 to the object 151 in this manner is to protect the connections between the compressor 111 and the circulatory network 141 and the reservoir 114 and the circulatory network 141.

Figure 5:
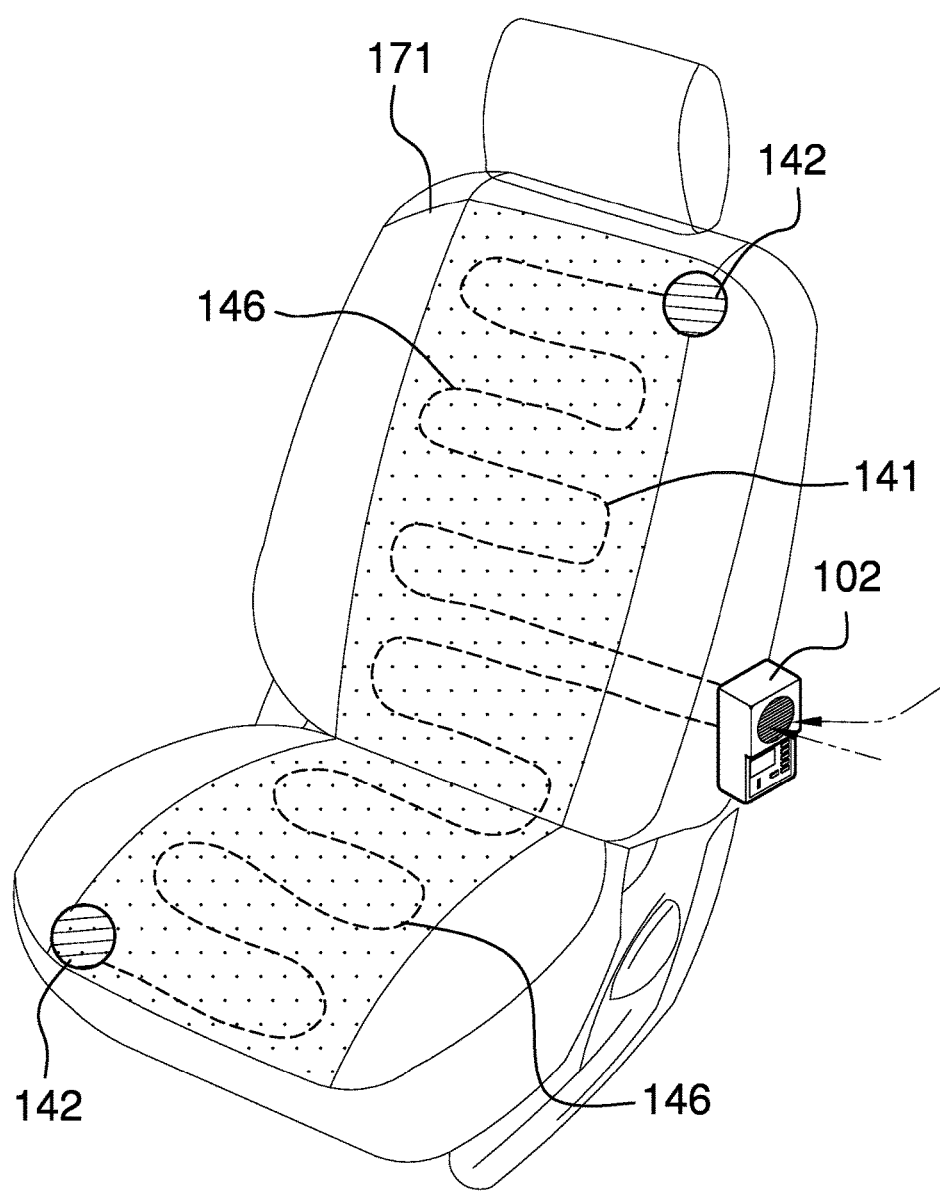
FIG. 5 is an in use view of an embodiment of the disclosure.
Figure 6:
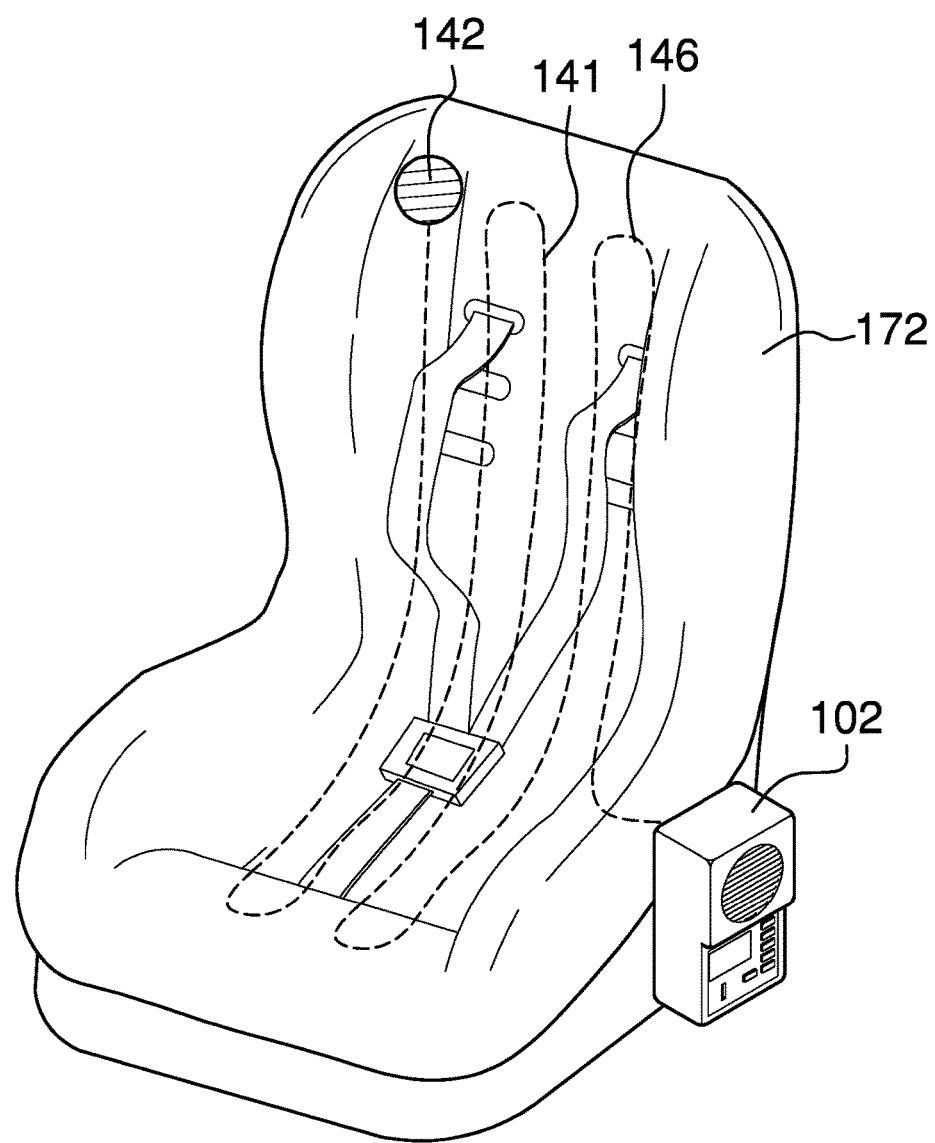
FIG. 6 is an in use view of an alternate embodiment of the disclosure.

In the second potential embodiment of the disclosure, as shown most clearly in FIG. 5, the circulatory network is adapted to work with a vehicle seat 171. The circulatory network 141 is installed in the vehicle seat 171 such that the circulatory network 141 runs directly underneath the coverings of the vehicle seat 171 such that a passenger sitting in the vehicle seat 171 will effectively be sitting on the circulatory network 141. In this scenario, the passenger is cooled by reduction of pressure of the working fluid 118 as it passes through the circulatory network 141. As a side note, the vehicle seat 171 may involve any type of vehicle, which is to say land, sea, and air.

In a third potential embodiment of the disclosure, the object 151 the circulatory network is installed in is a child safety seat 172. The circulatory network 141 is installed in the child safety seat 172 such that the circulatory network 141 runs directly underneath the coverings of the child safety seat 172 such that a passenger sitting in the child safety seat 172 will effectively be sitting on the circulatory network 141. In this scenario, the passenger is cooled by reduction of pressure of the working fluid 118 as it passes through the circulatory network 141.

In the second potential embodiment of the disclosure and the third potential embodiment of the disclosure, the charging device 117 is adapted for use with the vehicle electrical system 173.

The following definitions were used in this disclosure:

Battery: As used in this disclosure, a battery is a structure consisting of one or more cells, in which chemical energy is converted into electricity and used as a source of power.

Cantilever: As used in this disclosure, a cantilever is a beam or other structure that projects away from an object and is supported on only one end.

Elastic: As used in this disclosure, an elastic is a material or object that deforms when a force is applied to it and that is able to return to its original shape after the force is removed. A material that exhibits these qualities is also referred to as an elastomeric material.

Fan: As used in this disclosure, a fan is a mechanical device with rotating blades that is used to create a flow or current of air.

Ridge: As used in this disclosure, a ridge is an elevated or raised portion of a structure.

Rim: As used in this disclosure, a rim is an outer edge or border that follows along the perimeter of an object.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A refrigeration device comprising a cooling unit, a housing, a control system, and a circulatory network; wherein the cooling unit and the control system are contained within the housing; wherein the refrigeration device is an electrically operated and portable device; wherein the refrigeration device cools an object; wherein the circulatory network is installed within the object; wherein the refrigeration device attaches to the object; wherein the cooling unit further comprises a compressor, a reservoir, an evaporator, a battery, a charging device, and a working fluid; wherein the working fluid is pumped through loop comprising the circulatory network the compressor, evaporator, and reservoir; wherein the working fluid is a compressible fluid; wherein the compressor is a mechanical device increases the pressure of the working fluid; wherein the compressor comprises an electric motor; wherein the reservoir is a collection tank that is used to store the working fluid; wherein the battery provides electrical energy for the operation of the compressor and the control system; wherein the charging device is an electric circuit that renews and restores the electrical energy stored within the battery; wherein the circulatory network is a plumbing loop that is installed in the object; wherein the circulatory network cools the object through the reduction of pressure of the working fluid as it passes through the object; wherein the compressor increases the pressure of the working fluid and pumps the working fluid into the circulatory network; wherein the circulatory network is piped to discharge the working fluid, at the reduced pressure, to the reservoir, which provides the stock of working fluid form which the compressor draws; wherein the cooling unit is stored in the housing; wherein the housing is a rigid structure that further comprises a container, an air intake vent, and an exit vent, and a ring; wherein the ring is a structural ring that is attached to the housing; wherein the ring is further formed with an interior screw thread; wherein the control system turns the refrigeration device on and off; wherein the object further comprises a collar and a first exterior screw thread; wherein the first exterior screw thread is formed on the collar; wherein the collar is a ridge that forms a rim that is formed on the object; wherein the rim defines a perimeter within which the circulatory network is accessed; wherein the housing is then attached to the object by attaching the first exterior screw thread of the collar to the interior screw thread of the ring; wherein the object is a vehicle seat; wherein the refrigeration device is adapted for use with a vehicle electrical system.

2. The refrigeration device according to claim 1
wherein the object is a child safety seat;
wherein the refrigeration device is adapted for use with a vehicle electrical system.

\* \* \* \* \*